(12) United States Patent
Oueslati et al.

(10) Patent No.: US 6,906,701 B1
(45) Date of Patent: Jun. 14, 2005

(54) ILLUMINATABLE BUTTONS AND METHOD FOR INDICATING INFORMATION USING ILLUMINATABLE BUTTONS

(75) Inventors: Hatem Oueslati, Montpellier (FR); Regis Nicolas, Montpellier (FR); Renaud Malaval, Montpellier (FR); Christophe Sureau, Montpellier (FR)

(73) Assignee: palmOne, Inc., Santa Clara, CA (US)

( * ) Notice: Subject to any disclaimer, the term of this patent is extended or adjusted under 35 U.S.C. 154(b) by 335 days.

(21) Appl. No.: 09/918,968

(22) Filed: Jul. 30, 2001

(51) Int. Cl.$^7$ .................................................. G09G 5/00
(52) U.S. Cl. ...................... 345/170; 345/168; 345/864; 341/22
(58) Field of Search ................................ 345/168–172, 345/864; 341/22, 23; 200/313, 314, 308

(56) References Cited

U.S. PATENT DOCUMENTS

| | | | | |
|---|---|---|---|---|
| 3,911,424 A | * | 10/1975 | Giannuzzi et al. | 345/169 |
| 5,408,060 A | * | 4/1995 | Muurinen | 200/314 |
| 5,818,361 A | * | 10/1998 | Acevedo | 341/23 |
| 5,867,149 A | * | 2/1999 | Jaeger | 345/172 |
| 5,920,826 A | * | 7/1999 | Metso et al. | 455/557 |
| 6,178,403 B1 | * | 1/2001 | Detlef | 704/270 |
| 6,310,609 B1 | * | 10/2001 | Morgenthaler | 345/170 |
| 6,339,374 B1 | * | 1/2002 | Chou | 340/540 |
| 6,415,164 B1 | * | 7/2002 | Blanchard et al. | 455/566 |

* cited by examiner

*Primary Examiner*—Alexander Eisen
(74) *Attorney, Agent, or Firm*—Wagner, Murabito & Hao LLP

(57) ABSTRACT

A method and apparatus for indicating information to a user of a palmtop computer. Illuminatable hard buttons are disclosed that are operable for performing functions. The hard buttons are selectively illuminated to indicate information to a user that relates to the function performed when the bard button is pressed. The selective illumination of hard buttons to indicate information that relates to the function that is performed when the hard button is pressed conveys information to the user in a manner that is easily understood by the user. In one embodiment, whether or not the button is illuminated and the color of the illumination, convey information about the function that is to be performed when the button is pressed.

21 Claims, 8 Drawing Sheets

ILLUMINATABLE BUTTONS AND METHOD FOR INDICATING INFORMATION USING ILLUMINATABLE BUTTONS

BACKGROUND OF THE INVENTION

1. Field of the Invention

The present invention relates to the field of computer systems. Embodiments of the present invention relate to the field of portable computers. More specifically, the present invention discloses a method and apparatus for indicating information to a user using illuminatable buttons or keys.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Some palmtop computers use hard buttons to initiate commonly used functions. The term "hard buttons" covers actual physical buttons or keys that can be pressed by a user. The term "hard buttons" is used primarily to distinguish actual physical buttons that can be pressed from "soft buttons," or software implemented buttons that are formed using a touch screen and a display of an image or icon that resembles a button. There is no requirement that hard buttons be hard in the physical sense of the word. In fact many hard buttons are formed of soft plastic. Because of the limited amount of surface area on the top of a palmtop computer, only a few hard buttons are used. The number of hard buttons is typically limited to prevent confusion and to make the palmtop computer easy to use.

As usage of palmtop computers has expanded, so has the need to convey information to a user. More particularly, basic functions such as date book function, address book function, to-do function, and memo function have grown in richness and complexity as new features are added. Therefore, there is a need to convey additional information to the user relating to these functions. In addition, as new functionality is added, (e.g., new games and new uses for the existing hard buttons) there is a need to convey information to a user that relates to the new functionality.

The information conveyed to the user must be easily integrated into the existing palmtop design and must be in a format that is easily understood by a user. The easiest way to convey information to the user in a manner that is easily integrated into the existing palmtop design is to program additional displays of graphical images or text on the display screen. However, the display screen of a palmtop computer is quite small. Therefore, it is difficult to add new images and/or text to existing displays in order to convey additional information to a user. Moreover, when new images and/or text are added to existing displays, the resulting display is often too cluttered with information to effectively convey information to the user. More particularly, because so much information is presented on the display, it is difficult for the user to comprehend the newly added information.

What is needed is a method and apparatus that can convey information to a user of a palmtop computer which is easily understood by the user. In addition, a method and apparatus is needed that meets the above need and that is easily integrated into existing palmtop computer designs. The present invention meets the above needs.

SUMMARY OF THE INVENTION

The present invention provides a method and apparatus for indicating information to a user of a palmtop computer. More particularly, in the present invention, illuminatable hard buttons are selectively illuminated to indicate information to a user.

A palmtop computer system is disclosed that includes illuminatable hard buttons for performing functions. The illuminatable hard buttons are selectively illuminated so as to convey information to a user that relates to the function that is performed when the hard button is pressed. In one embodiment, each illuminatable hard button includes a contoured region that is contoured in the shape of a symbol that represents the primary function that is performed when the hard button is pressed. In one embodiment, whether or not the button is illuminated, and the color of the illumination convey information about the function that is to be performed when the button is pressed.

A method for conveying information to a user of a palmtop computer is disclosed that uses illuminatable hard buttons. In this method, the hard buttons are selectively illuminated so as to convey information to a user that relates to the function performed by the hard button.

In one embodiment of the present invention, hard buttons are illuminated in a variety of different colors with the different colors conveying information to the user. In another embodiment, the hard buttons are intermittently illuminated such that they blink. In another embodiment, the colors of the hard buttons are uniform.

In one embodiment, the hard buttons are illuminated both when the palmtop computer is turned on and when the palmtop computer is turned off. Thereby, information is conveyed to a user even when the palmtop computer is turned off. Because illumination of hard buttons takes much less battery power than powering on the palmtop computer, illumination of hard buttons efficiently conveys information to the user.

The selective illumination of hard buttons to indicate information that relates to the function that is performed when the button is pressed conveys information to the user in a manner that is easily understood by the user. In addition, because the hard buttons of the present invention are used in place of existing function keys, the method and apparatus of the present invention is easily integrated into existing palmtop computer designs.

These and other advantages of the present invention will no doubt become apparent to those of ordinary skill in the art after having read the following detailed description of the preferred embodiments which are illustrated in the various drawing figures.

The drawings referred to in this description should be understood as not being drawn to scale unless specifically noted otherwise.

DETAILED DESCRIPTION OF THE INVENTION

In the following detailed description of the present invention, a method and apparatus for conveying information to a user of a palmtop computer, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or "computing" or "translating" or calculating or "determining" or "scrolling" or "displaying" or "illuminating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
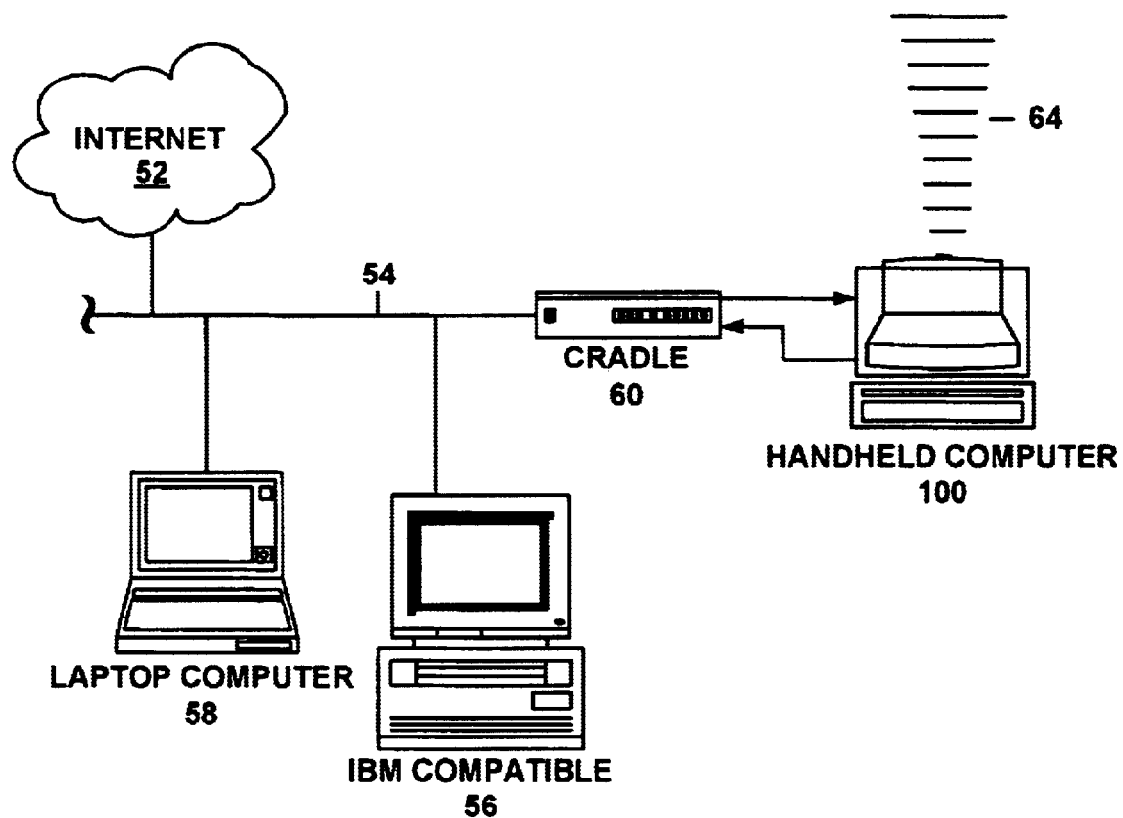
FIG. 1 is system illustration of an exemplary palmtop computer system that is connected to other computer systems and the Internet via a cradle device.

FIG. 1 illustrates a system 50 that can be used in conjunction with the method for conveying information to a user of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2:
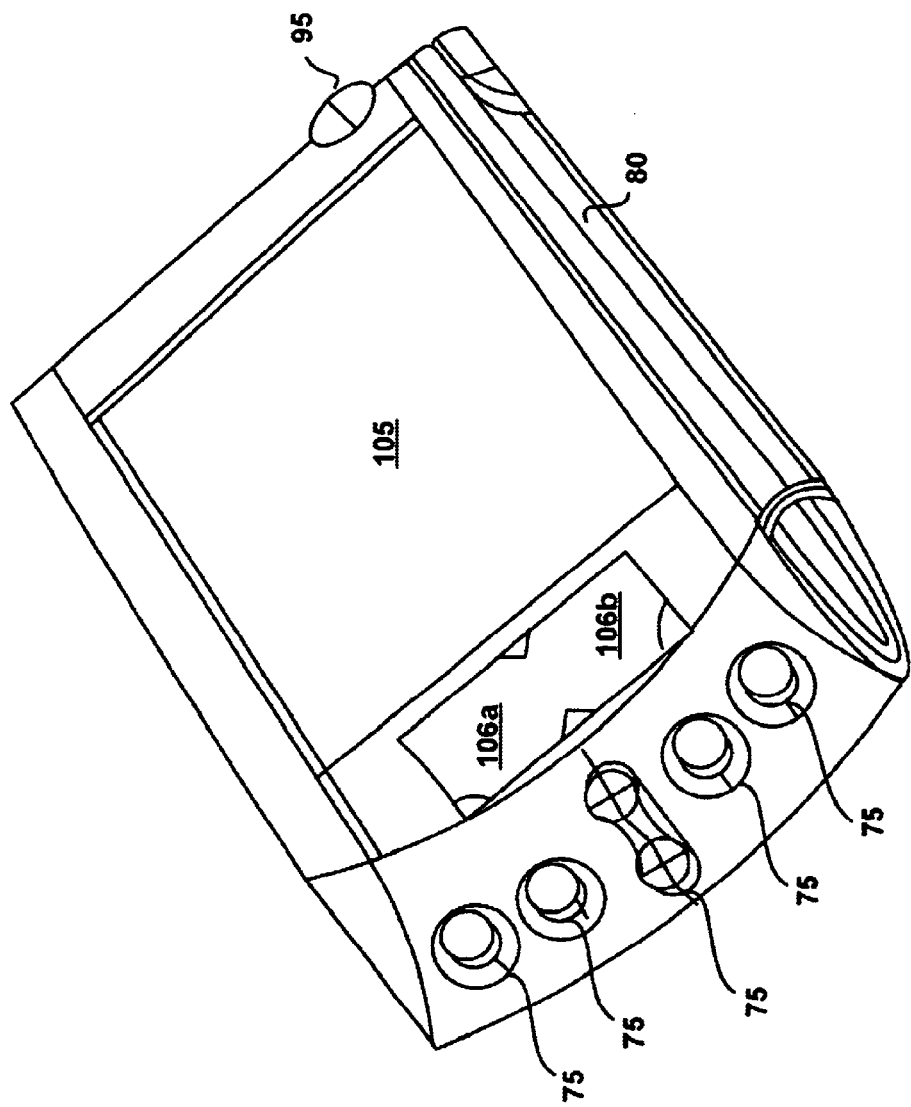
FIG. 2 is a top side perspective view of a palmtop computer system that includes illuminatable hard buttons and that can be used as a platform for the method for conveying information to a user of the present invention.

FIG. 2 is a perspective illustration of the top face 110a of one embodiment of the palmtop computer system of the present invention. The top face 100a contains a display screen 105 surrounded by a bezel or cover. A removable stylus 80 is also shown. On/off button 95 allows for turning palmtop computer system 100 on and off. The display screen 105 is a touch screen able to register contact between the screen and the tip of the stylus 80. The stylus 80 can be of any material to make contact with the screen 105.

The top face 100a also contains one or more dedicated and/or programmable illuminatable buttons 75 for selecting information and causing the computer system to implement functions. In the present embodiment, illuminatable hard buttons 75 are hard buttons. That is, they are actual physical buttons or keys that operate by mechanically being pressed. The term "hard button" is used herein to distinguish the buttons of the present invention from "soft buttons" which are commonly implemented using a touch screen in conjunction with the display of an on-screen image or icon that looks like a button.

Hard buttons 75 can be pressed to perform specific functions. Each of buttons 75 have a primary function that is performed in normal operation modes. That is, when the palmtop computing device is operated in a normal operation mode and a hard button 75 is pressed, the primary function assigned to the hard button 75 is performed. However, in specialized applications, hard buttons 75 can be programmed to perform other functions (secondary functions) that relate to the application that is being used at the time. For example, when a game is being played, hard buttons 75 perform functions that relate to the game being played.

In one embodiment, the present invention includes an application program that is programmable for controlling the function performed by hard buttons 75. In the present embodiment, there is also an application program that is programmable to control the illumination of buttons 75. In the present embodiment, the illumination of hard buttons can be programmed by a user. In one embodiment, a single application program that can be programmed by a user controls both function assignment and illumination. Therefore, both the function performed and the illumination of buttons 75 can be easily integrated into applications for conveying information to a user.

FIG. 2 also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
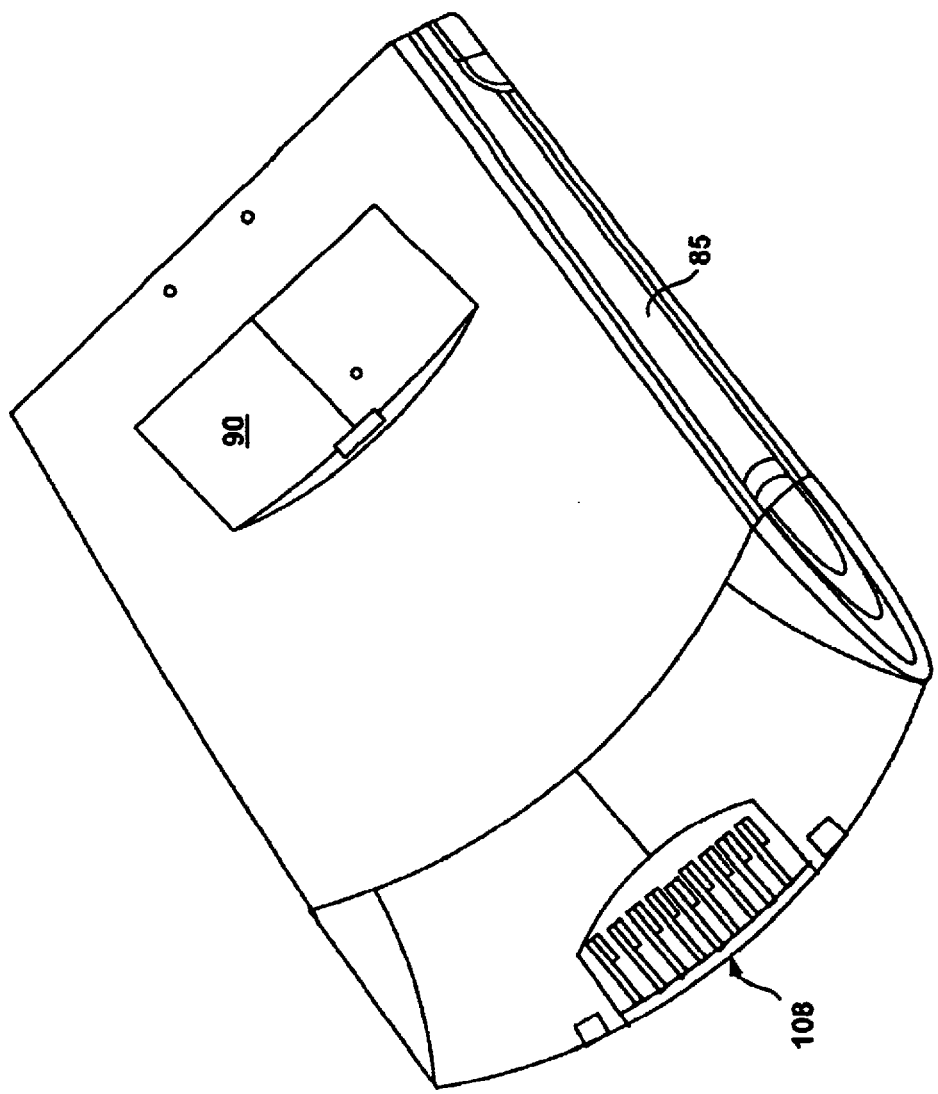
FIG. 3 is a bottom side perspective view of the palmtop computer system of FIG. 2 in accordance with an embodiment of the present invention.

FIG. 3 illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, communication interface 108 is a serial communication port, but could also alternatively be of any of a number of well known communication standards and protocols, e.g., parallel, SCSI, Firewire (IEEE 1394), Ethernet, etc.

Figure 4:
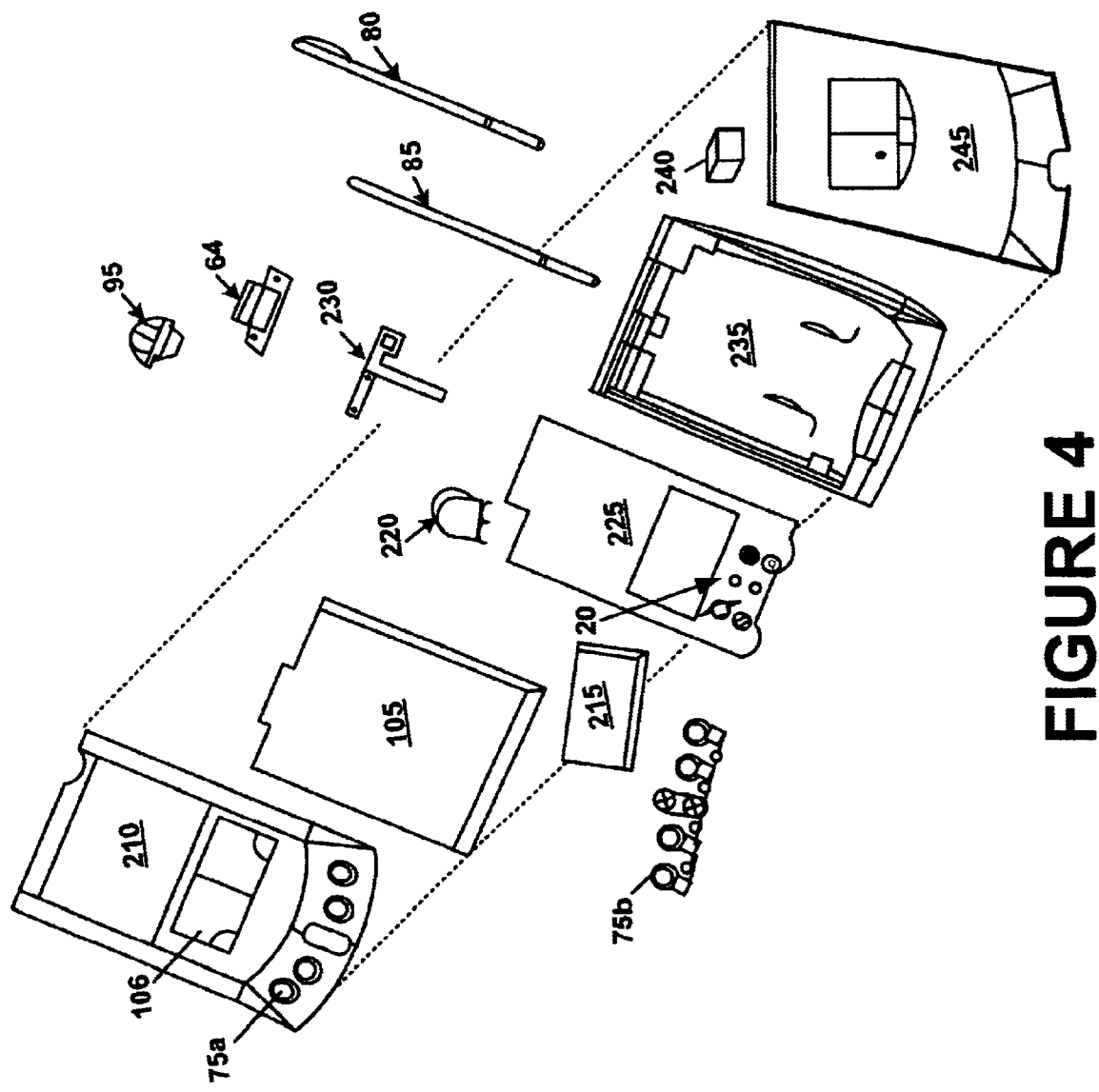
FIG. 4 is an exploded view of the components of the palmtop computer system of FIG. 2 in accordance with an embodiment of the present invention.

FIG. 4 is an exploded view of the palmtop computer system 100 in accordance with one implementation. System 100 contains a front cover 210 having an outline of region 106 and holes 75a for receiving illuminatable buttons 75. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80.

A radio receiver/transmitter device 240 is also shown between the midframe and the rear cover 245 of FIG. 4. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Continuing with FIG. 4, hard buttons 75 include a non-opaque cover that allows light to pass therethrough. In the present embodiment, Light Emitting Diodes (LEDs) 20 provide illumination. LEDs 20 are shown to be located on PC board 225 such that LEDs 20 underlie each of illuminatable buttons 75. In the present embodiment, LEDs 20 include a green LED, an orange LED and a red LED that underlie each of illuminatable buttons 75.

In operation, upon selectively illuminating ones of LEDs 20, illuminatable buttons 75 are illuminated to emit a green color, an orange color, or a red color. In the present embodiment, only 3 LEDs 20 are shown. However, it is appreciated that more or fewer LEDs 20 could also be used. In addition, though LEDs 20 are described as being green, orange and red, other colors could also be used. Also, more than one LED may be active for illuminating any hard button.

Figure 5:
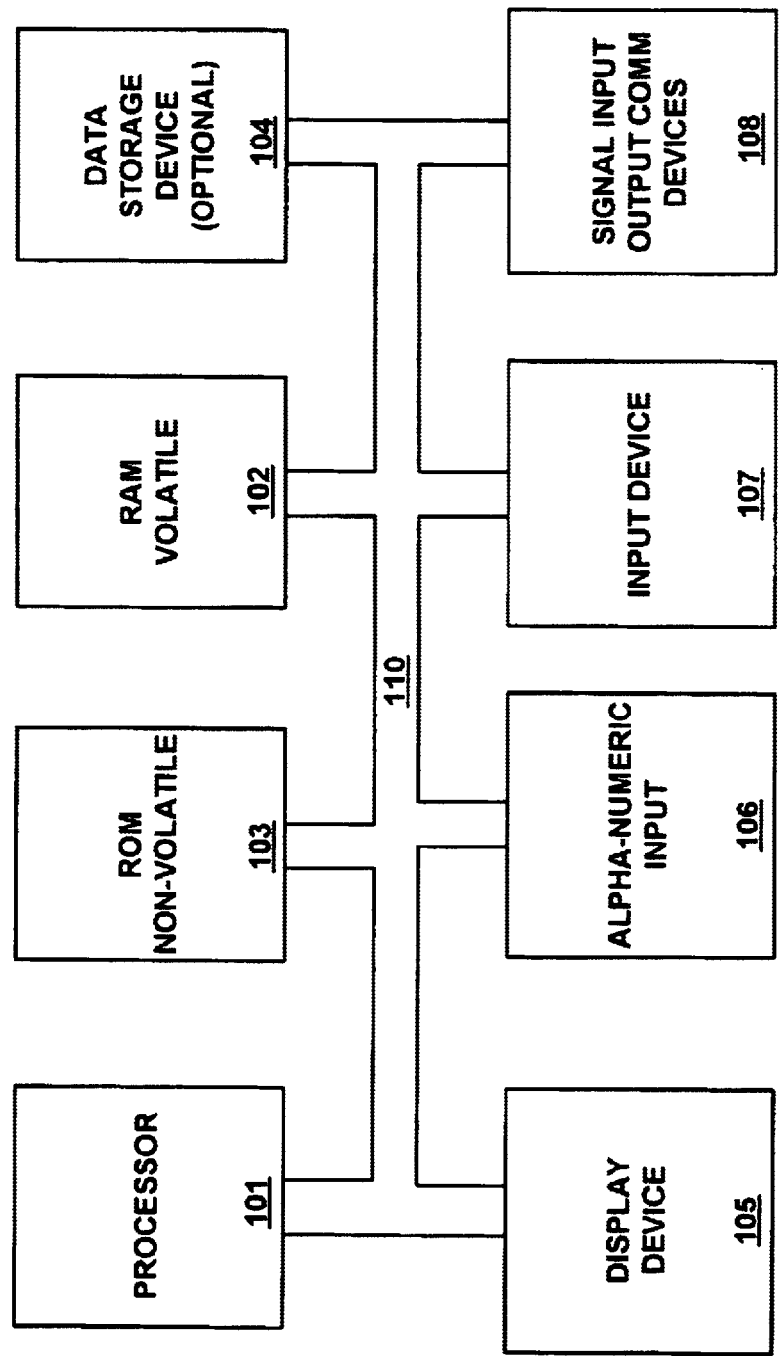
FIG. 5 is a logical block diagram of a palmtop computer system in accordance with an embodiment of the present invention.
Figure 8:
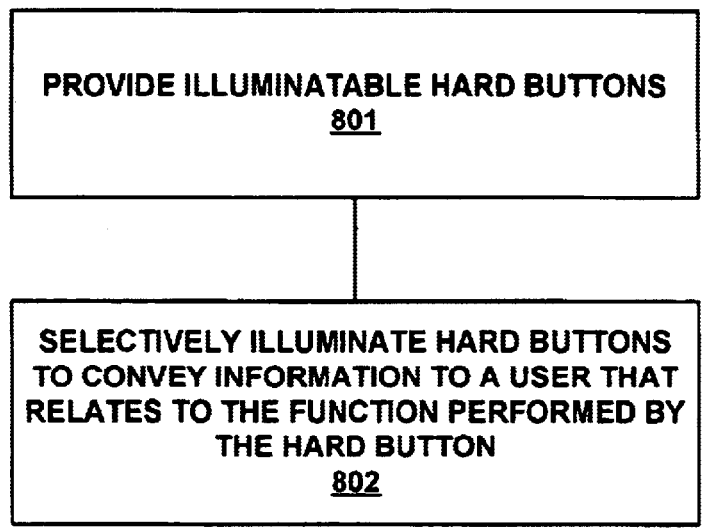
FIG. 8 is a flow chart illustrating a method for conveying information to a user in accordance with an embodiment of the present invention.

FIG. 5 illustrates circuitry of computer system 100, some of which can be implemented on PC board 225. The computer system 100 can be used to perform the method for conveying information to a user of a palmtop computer of the present invention, e.g., process 800 (FIG. 8). Computer system 100 includes an address/data bus 110 for communicating information, a central processor 101 coupled with the bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Computer system 100 also includes an optional data storage device 104 (e.g., memory sick) coupled with the bus 110 for storing information and instructions. Device 104 can be removable. As described above, system 100 also contains a display device 105 coupled to the bus 110 for displaying information to the computer user. PC board 225 can contain the processor 101, the bus 110, the ROM 103 and the RAM 102.

Also included in computer system 100 of FIG. 5 is an optional alphanumeric input device 106 which in one implementation is a handwriting recognition pad ("digitizer") having regions 106a and 106b (FIG. 2), for instance. Device 106 can communicate information and command selections to the central processor 101. Computer system 100 also includes an input device 107 that is a cursor control or directing device which is coupled to the bus 110 for communicating user input information and command selections to the central processor 101. In one implementation, input device 107 is a touch screen device incorporated with screen 105. Device 107 is capable of registering contact with screen 105 and is capable of registering the position on screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

In the present embodiment, input device 107 includes function keys that are coupled to bus 110 (e.g., illuminatable hard buttons 75) for causing the computer system to perform functions.

In one embodiment, non-volatile memory unit (ROM) 103 of FIG. 5 includes instructions that when executed by processor 101 selectively illuminate ones of said hard buttons 75 so as to convey information to a user that relates to the function that is performed when hard buttons 75 are pressed. In the embodiment shown in FIGS. 6–7, non-volatile memory unit (ROM) 103 of FIG. 5 includes instructions that when executed by processor 101 selectively illuminate ones of said contoured regions 8a–8f (FIGS. 6–7) of hard buttons 2–7 so as to convey information to a user that relates to the function that is performed when hard buttons 2–7 are pressed.

Figure 6:
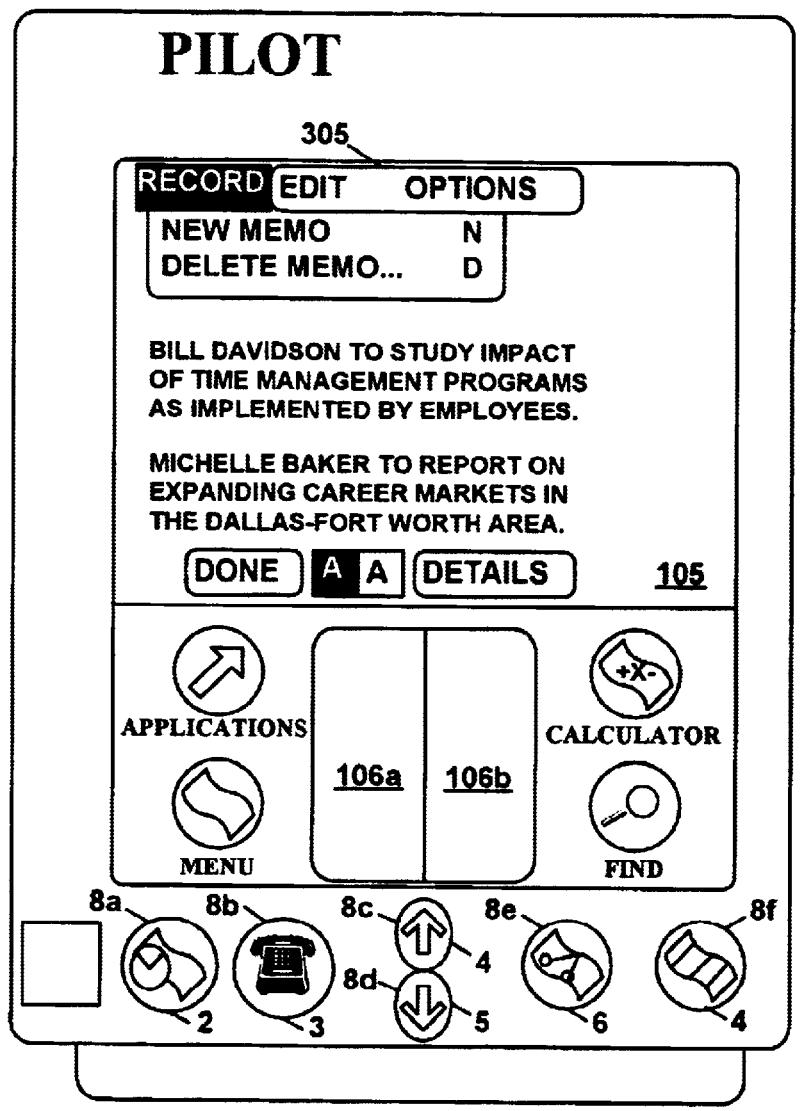
FIG. 6 is a front view of a palmtop computer system that includes illuminatable hard buttons having contoured regions formed therein that are contoured in the shape of symbols that represent the primary function of each hard key in accordance with an embodiment of the present invention.
Figure 7:
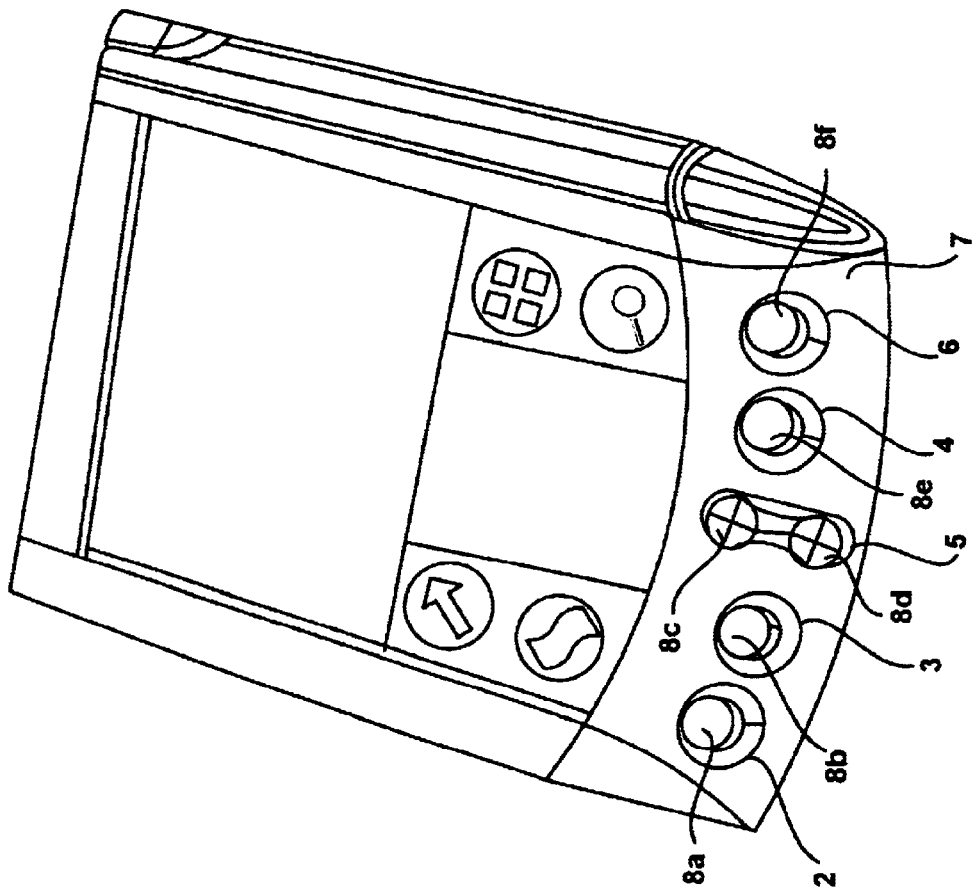
FIG. 7 is a top right side perspective view of the palmtop computer system of FIG. 6 in accordance with an embodiment of the present invention.

FIGS. 6–7 show an embodiment of palmtop computer system 100c that includes illuminatable hard buttons 2–7. In the present embodiment, each of illuminatable hard buttons 2–7 have a contoured region formed therein that is contoured in the shape of a symbol that represents a function that is performed when said hard button is pressed.

Contoured regions 8a–8f can be formed in any of a number of ways. In the present embodiment, contoured regions 8a–8f are cut-out regions within hard buttons 2–7 that allow light to pass therethrough. Preferably, there is a clear plastic liner that underlies each cutout region so as to seal off and protect the internal components of palmtop computer 100a. Alternatively, contoured regions 8a–8f could be filled-in using clear insets that fit within each cut-out region. In an alternate embodiment, contoured regions 8a–8f can be clear regions that are formed within the molded plastic part that forms the exterior of buttons 2–7.

In the present embodiment, contoured regions 8a–8f are contoured in the shape of a symbol that represents the primary function that is performed when the hard button 2–7 is pressed. More particularly, contoured region 8a is contoured in the shape of a symbol that represents the primary function performed by hard button 2. Contoured region 8b is contoured in the shape of a symbol that represents the primary function performed by hard button 3. Similarly, contoured region 8c is contoured in the shape of a symbol that represents the primary function performed by hard button 4 and contoured region 8d is contoured in the shape of a symbol that represents the primary function performed by hard button 5. Also, contoured region 8e is contoured in the shape of a symbol that represents the primary function performed by hard button 6 while contoured region 8f is contoured in the shape of a symbol that represents the primary function performed by hard button 7.

In the present embodiment, the primary function of hard button 2 is initiation of operation of a date book application. The date book application is operable to allow a user to track appointments, notes and deadlines. In the present embodiment, the date book application displays calendars and allows for the scheduling of appointments and the generation of date book alerts. In the present embodiment, a clock and a date book are used as a symbol that represents the primary function of hard button 2 (initiation of a datebook application). Accordingly, contoured region 8a is contoured in the shape of symbol that includes a clock and a date book.

In the present embodiment, the primary function of hard button 3 is initiation of operation of an address book function. In the present embodiment, a telephone handset is used as a symbol that represents the address book function. Accordingly, contoured region 8b is contoured in the shape of a telephone handset.

The primary function of hard button 4 is an up function. More particularly, upon pressing hard button 4, upward movement is obtained within the operating application. This upward movement can be reflected in upward movement on a page, scrolling to a previous page, scrolling to a previous record, upward movement in a game, etc. In the present embodiment, an upward pointing arrow is used as a symbol that represents the up function. Thus, contoured region 8c is contoured in the shape of an upward pointing arrow.

Continuing with FIGS. 6–7, the primary function of hard button 5 is a down function. More particularly, upon pressing hard button 5, downward movement is obtained within the operating application. This downward movement can be reflected in downward movement on a page, scrolling to a subsequent page, scrolling to a subsequent record, downward movement in a game, etc. in the present embodiment, a downward pointing arrow is used as a symbol that represents the down function. Therefore, contoured region 8d is contoured in the shape of a downward pointing arrow.

Hard buttons 4–5 can be used exclusively for scrolling through documents. This allows for elimination of soft scrolling bars on the display, saving valuable display space. Alternatively, hard buttons 4–5 can be used along with conventional soft scroll bars to indicate when a user can move up or down within a particular application.

In the present embodiment, the primary function of hard button 6 is initiation of operation of a "to-do" application. The to-do application allows the user to create, modify and save a to-do list. In the present embodiment, a stylized to-do list page is used as a symbol that represents the primary function of hard button 6 (initiation of the to-do application). Accordingly, contoured region 8e is contoured in the shape of stylized to-do list.

Continuing with FIGS. 6–7, the primary function of hard button 7 is initiation of operation of a memo application. In the present embodiment, a curved line that includes a centrally located vertical loop is used as a symbol that represents the primary function of hard button 6 (initiation of the memo application). Accordingly, contoured region 8f is contoured in the shape of a curved line that includes a centrally located vertical loop.

FIG. 8 illustrates method 800 for conveying information to a user in accordance with one embodiment of the present invention. In one embodiment, palmtop computer system 100 of FIGS. 1–6 is used as a platform for method 800. It is appreciated that method 800 can be implemented as instructions stored in computer memory and executed over a processor of palmtop computing devices other than those palmtop computing devices shown in FIGS. 1–7.

As shown by step 801 hard buttons that are operable to perform specific functions are provided. In the present embodiment, hard buttons 75 of FIGS. 1–4 and hard buttons 2–7 of FIGS. 6–7 can be used for performing functions. Also, light sources are provided as shown by step 802. In the embodiment shown in FIG. 4, light sources are LEDs 20 located under buttons 75 such that, when LEDs 20 are illuminated, light is emitted through hard buttons 75. However, the present invention is well adapted for use of other types of light sources such as, for example light bulbs, incandescent bulbs, etc.

As shown by step 802, hard buttons are selectively illuminated to convey information to a user that relates to the function performed by the hard button. In the embodiment shown in FIGS. 6–7, hard buttons 2–7 are selectively illuminated such that light is emitted through the contoured regions 8a–f to communicate information to a user of palmtop computer system 100c that relates to the function performed by the illuminated hard button.

Continuing with step 802, in the embodiment shown in FIGS. 6–7, hard button 2 is operable to initiate operation of a date book function. In the present embodiment, hard button 2 is illuminated (light is emitted through contoured region 8a) when a date book alert occurs.

In the present embodiment, date book alerts include meeting reminders and hard button 2 is illuminated to indicate meeting reminders. Meeting reminders are configurable and can be set for any time prior to a meeting and a meeting reminder is indicated when it is time for a scheduled meeting to occur. Therefore, for example, a user can schedule meeting reminders for thirty minutes prior to a meeting and five minutes prior to a meeting which will result in a first meeting reminder that is indicated thirty minutes prior to the meeting, a second meeting reminder that is indicated five minutes prior to the meeting and a third meeting reminder that is indicated at the time of the scheduled meeting. Hard button 2 is illuminated in different colors to indicate the different meeting reminders. In one embodiment, hard button 2 is illuminated in a first color (e.g., green) to indicate the first meeting reminder, illuminated in a second color (e.g., orange) to indicate the second meeting reminder, and illuminated in a third color (e.g., red) to indicate that the time for the scheduled meeting has passed.

Continuing with step 802 of FIG. 8, in the embodiment shown in FIGS. 6–7, hard button 3 is operable to initiate operation of an address book function. In the present embodiment, hard button 3 is illuminated (light is emitted through contoured region 8b) when a call is missed. Also, when a call has been missed and hard button 3 is illuminated, pressing hard button 3 operates to display the address book entry relating to the sender of the missed call. This allows a user to easily and quickly determine the identity of the caller and return the call.

Continuing with step 802, in the embodiment shown in FIGS. 6–7, hard button 4 is operable to perform an up function. Hard button 4 is illuminated (light is emitted through contoured region 8c) when a user can scroll up within a particular application.

In the embodiment shown in FIGS. 6–7, hard button 5 is operable to perform a down function. Hard button 5 is illuminated (light is emitted through contoured region 8d) when a user can scroll down within a particular application.

Hard button 6 of FIGS. 6–7 is operable to initiate operation of a "to-do" application. In the present embodiment, hard button 6 is illuminated (light is emitted through contoured region 8e) when a due date for an item on the to-do list has passed. The color in which hard button 6 is illuminated indicates the priority of the task on the to-do list.

In the embodiment shown in FIGS. 6–7, hard button 7 is operable to initiate operation of a memo function. In the present embodiment, hard button 7 is illuminated (light is emitted through contoured region 80 when a short message service message has been received. The color in which hard button 7 is illuminated indicates the priority of the received message. Also, when hard button 7 is pressed when it is illuminated, the short message service message that was previously received is displayed.

Hard buttons 2–7 can be redefined to perform a specific function that relates to an application that is being performed. This feature is commonly used in applications such as games to receive input from a user. In these applications, indication of actions that can be taken by the user is accomplished by selective illumination of hard buttons. That is, for example, in a game in which hard buttons are redefined to perform a specific action, hard buttons 2–7 are selectively illuminated to indicate actions that can be taken during the game. For example, if the user can go up (and hard button 4 is redefined to perform that function), then hard button 4 is illuminated. If the user can fire (and hard button 7 is redefined for that function) then hard button 7 is illuminated.

Hard buttons 2–7 can also be illuminated to guide the user to perform an action. In one embodiment of the present invention, hard buttons 2–7 are selectively illuminated to indicate actions that should be taken by a user. For example, hard buttons 2–7 can be selectively illuminated during a game to teach the user to play the game by indicating actions that should be taken by the user during the game. For example, if the user is supposed to go up (and hard button 4 is redefined to perform that function), then hard button 4 is illuminated. If the user is supposed to fire (and hard button 7 is redefined for that function) then hard button 7 is illuminated. This feature is easy to understand and quite effective for teaching a user to operate a program (e.g., play a game).

The illuminatable hard buttons of the present invention can also be intermittently illuminated such that they blink on and off. This can be used to convey additional information to a user. Also, it is appreciated that further meaning can be conveyed by the combination of color and intermittent illumination (blinking).

In one embodiment, the hard buttons of FIGS. 2–7 are illuminated both when the palmtop computer is turned on and when the palmtop computer is turned off. Thereby, information is conveyed to a user even when the palmtop computer is turned off. Because illumination of hard buttons takes much less battery power than powering on the palmtop computer, illumination of hard buttons efficiently conveys information to the user.

The preferred embodiment of the present invention, a method and apparatus for conveying information to a user, is thus described. While the present invention has been described in particular embodiments, it should be appreciated that the present invention should not be construed as limited by such embodiments, but rather construed according to the below claims.

What is claimed is:

1. In a palmtop computer system, a method for conveying information to a user comprising the steps of:

a) providing a hard button that is operable to perform a primary function, said hard button having a contoured region formed therein that is contoured in the shape of a symbol that represents said primary function;

b) providing at least one light source, said light source located such that, when said light source is illuminated, light is emitted through said contoured region so as to illuminate said hard button; and c) selectively illuminating said hard button to communicate information to a user of said palmtop computer system regarding and in response to the occurrence of a particular event that is associated with said hard button, wherein said selectively illuminating of said hard button provides information regarding said event to indicate that said hard button may be pressed to perform a function and wherein a color of said light emitted through said contoured region communicates further information to said user that relates to said primary function and a secondary function.

2. A method as described in claim 1 wherein said event is a date book alert and wherein said primary function is initiation of a date book application, and wherein step c) further comprises the step of:

c1) illuminating said hard button when said date book alert occurs.

3. A method as described in claim 1 wherein said event is a missed call and wherein said primary function is initiation of an address book application, and wherein step c) further comprises the step of:

c1) illuminating said hard button when said call is missed.

4. A method as described in claim 3 further comprises the step of:

d) displaying the address book entry relating to the sender of said missed call when said hard button pressed while said hard button is illuminated.

5. A method as described in claim 1 wherein said primary function is an up function, and wherein step c) further comprises the step of:

c1) illuminating said hard button when a user can scroll up within a particular application.

6. A method as described in claim 1 wherein said primary function is a down function, and wherein step c) further comprises the step of:

c1) illuminating said hard button when a user can scroll down within a particular application.

7. A method as described in claim 1 wherein said hard button is programmable to perform functions other than said primary function, and wherein said hard button is selectively illuminated to indicate actions that can be taken by a user.

8. A method as described in claim 1 wherein said hard button is programmable to perform functions other than said primary function, and wherein said hard button is selectively illuminated to indicate functions that should be taken by a user.

9. In a palmtop computer system, a method for conveying information to a user comprising the steps of:

a) providing a hard button that is operable to perform a primary function, said hard button having a contoured region formed therein that is contoured in the shape of a symbol that represents said primary function;

b) providing at least one light source, said light source located such that, when said light source is illuminated, light is emitted through said contoured region so as to illuminate said hard button; and c) selectively illuminating said hard button to communicate information to a user of said palmtop computer system regarding and in response to the occurrence of a particular event that is associated with said hard button, wherein said selectively illuminating of said hard button provides information regarding said event to indicate that said hard button may be pressed to perform a function, wherein said event is the reception of a short message service message wherein said primary function is initiation of a memo function, wherein said hard button is selectively illuminated when said short message service message has been received, said hard button illuminated in a color that indicates priority of said received message.

10. A method as described in claim 9 further comprising the step of:

d) displaying said short message service message when said hard button is pressed while said hard button is illuminated.

11. In a palmtop computer system, a method for conveying information to a user comprising the steps of:

a) providing a first hard button that is operable to initiate operation of a date book application, said first hard button having a contoured region formed therein that is contoured in the shape of a symbol that represents said date book application;

b) illuminating said contoured region of said first hard button when a date book alert occurs;

c) providing a second hard button that is operable to initiate operation of an address book application, said second hard button having a contoured region formed therein that is contoured in the shape of a symbol that represents said address book publication;

d) illuminating said contoured region of said second hard button when a call is missed;

e) providing a third hard button that is operable to initiate operation of a to-do application that generates a to-do list, said third hard button having a contoured region formed therein that is contoured in the shape of a symbol that represents said to-do application; and f) illuminating said third hard button when a due date for an item on said to-do list has passed.

12. A method as described in claim 11 further comprising the step of:

g) providing a fourth hard button that is operable to initiate operation of a memo application, said fourth hard button having a contoured region formed therein that is contoured in the shape of a symbol that represents said memo application; and h) illuminating said fourth hard button when a short message service message has been received.

13. A method as described in claim 12 further comprising the step of:

i) displaying said short message service message when said fourth hard button is pressed while said fourth hard button is illuminated, the color in which said fourth hard button is illuminated indicating the priority of said received message.

14. A method as described in claim 13 further comprising the steps of:

j) providing a fifth hard button that is operable to perform an up function, said fifth hard button having a contoured region formed therein that is contoured in the shape of a symbol that represents said up function;

k) illuminating said fifth hard button when a user can scrolled up within a particular application;

l) providing a sixth hard button that is operable to perform a down function, said sixth hard button having a contoured region formed therein that is contoured in the shape of a symbol that represents said down function; and m) illuminating said sixth hard button when a user can scroll down within a particular application.

15. A method as described in claim 11 wherein step b) further comprises the steps of:

b1) illuminating said first hard button in a first color to indicate a first meeting reminder;

b2) illuminating said first hard button in a second color to indicate a second meeting reminder; and b3) illuminating said first hard button in a third color to indicate a third meeting reminder.

16. A method as described in claim 11 wherein step c) further comprises the step of:

d1) displaying the address book entry relating to the sender of said missed call when said second button is pressed while said second button is illuminated.

17. A method as described in claim 11 wherein said third button is illuminated in a color that indicates the priority of said item on said to-do list.

18. A method as described in claim 11 wherein said first hard button and said second hard button and said third hard button are selectively illuminated to indicate actions that can be taken.

19. A method as described in claim 11 wherein said first hard button and said second hard button and said third hard button are selectively illuminated to indicate how actions that should be taken.

20. The method of claim 11 said method further comprises the step of:

g) providing a programmable application that is operable to control illumination of said first hard button and said second hard button and said third hard button.

21. In a palmtop computer system, a method for conveying information to a user comprising the steps of:

a) providing a hard button that is operable to perform a primary function, said hard button having a contoured region formed therein that is contoured in the shape of a symbol that represents said primary function;

b) providing at least one light source, said light source located such that, when said light source is illuminated, light is emitted through said contoured region so as to illuminate said hard button; and c) selectively illuminating said hard button to communicate information to a user of said palmtop computer system regarding and in response to the occurrence of a particular event that is associated with said hard button, wherein said selectively illuminating of said hard button provides information regarding said event to indicate that said hard button may be pressed to perform a function, wherein said particular event is the passing of a due date, wherein said primary function is initiation of a to-do application that is operable to generate a to-do list, wherein said hard button is selectively illuminating when said due date for an item on said to-do list has passed, wherein said hard button is illuminated in a color that indicates the priority of said item on said to-do list.

* * * * *